(12) United States Patent  (10) Patent No.: US 8,209,959 B2
Yamamoto  (45) Date of Patent: Jul. 3, 2012

(54) EXHAUST EMISSION PURIFICATION CONTROLLER OF INTERNAL COMBUSTION ENGINE

(75) Inventor: Takenobu Yamamoto, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 455 days.

(21) Appl. No.: 12/451,292

(22) PCT Filed: May 14, 2008

(86) PCT No.: PCT/JP2008/058854
§ 371 (c)(1),
(2), (4) Date: Nov. 5, 2009

(87) PCT Pub. No.: WO2008/140101
PCT Pub. Date: Nov. 20, 2008

(65) Prior Publication Data
US 2010/0126146 A1  May 27, 2010

(30) Foreign Application Priority Data

May 15, 2007  (JP) .................................. 2007-129607

(51) Int. Cl.
*F01N 3/00* (2006.01)
*F01N 3/10* (2006.01)
(52) U.S. Cl. ............................... 60/286; 60/299; 60/303
(58) Field of Classification Search ..................... 60/286
See application file for complete search history.

(56) References Cited

U.S. PATENT DOCUMENTS

2004/0006974 A1* 1/2004 Stroia et al. ..................... 60/286
2004/0006975 A1* 1/2004 Stroia et al. ..................... 60/286
2004/0040281 A1* 3/2004 Yamaguchi et al. ............ 60/274

(Continued)

FOREIGN PATENT DOCUMENTS

JP  A-2003-148133  5/2003
(Continued)

OTHER PUBLICATIONS

International Search Report for International Application No. PCT/JP2008/058854, issued Jun. 17, 2008.

(Continued)

*Primary Examiner* — Thomas Denion
*Assistant Examiner* — Jason Shanske
(74) *Attorney, Agent, or Firm* — Oliff & Berridge, PLC

(57) ABSTRACT

An ECU performs PM removal control, in which the bed temperature of a DPF is adjusted to a target bed temperature through addition of unburned fuel to exhaust gas. In the PM removal control, the ECU learns a learned value of a fuel addition amount by which the difference between the bed temperature and the target bed temperature of the DPF is corrected. When the determination in step S510 is positive, in other words, when it is determined that the flow of the exhaust gas to the DPF is in a steady state, the ECU stores a correction value K as a steady state learned value Ka in step S520. When the determination in step S510 is negative, in other words, when it is determined that the flow of the exhaust gas is in a transient state, the ECU stores the correction value K as a transient state learned value Kb in step S530. In the PM removal control, the ECU reflects the transient state learned value Kb in the fuel addition amount. NOx reduction control is carried out based only on the steady state learned value Ka.

7 Claims, 10 Drawing Sheets

U.S. PATENT DOCUMENTS

| | | | |
|---|---|---|---|
| 2004/0098978 A1* | 5/2004 | Tarabulski et al. | 60/286 |
| 2005/0028515 A1 | 2/2005 | Fukuma et al. | |
| 2005/0241301 A1 | 11/2005 | Okugawa et al. | |
| 2006/0094595 A1* | 5/2006 | Labarge | 502/325 |
| 2007/0079607 A1 | 4/2007 | Suzuki et al. | |
| 2007/0125071 A1* | 6/2007 | Westerberg | 60/286 |
| 2010/0031636 A1 | 2/2010 | Kiyofuji et al. | |

FOREIGN PATENT DOCUMENTS

| | | |
|---|---|---|
| JP | A-2003-172185 | 6/2003 |
| JP | A-2005-155422 | 6/2005 |
| JP | A-2005-181547 | 7/2005 |
| JP | A-2005-315198 | 11/2005 |
| JP | A-2006-291827 | 10/2006 |
| JP | A-2007-332932 | 12/2007 |
| JP | A-2008-202529 | 9/2008 |
| WO | WO 2008/102854 A1 | 8/2008 |
| WO | WO 2008/140101 A1 | 11/2008 |

OTHER PUBLICATIONS

U.S. Appl. No. 12/448,273, filed Jun. 16, 2009.
Jun. 23, 2011 Office Action issued in U.S. Appl. No. 12/448,273.
International Preliminary Report on Patentability for International Application No. PCT/JP2008/058854, issued Nov. 24, 2009.
International Preliminary Report on Patentability issued in International Application No. PCT/JP2008/052997.

* cited by examiner

EXHAUST EMISSION PURIFICATION CONTROLLER OF INTERNAL COMBUSTION ENGINE

FIELD OF THE INVENTION

The present invention relates to an exhaust emission purification controller of an internal combustion engine. The exhaust emission purification controller controls the bed temperature of an exhaust gas purifying catalyst, which is arranged in an exhaust passage of the engine, by adding unburned fuel to exhaust gas.

BACKGROUND OF THE INVENTION

When exhaust gas cools down in an internal combustion engine of a vehicle, such as a diesel engine, the bed temperature of an exhaust gas purifying catalyst, which is arranged in an exhaust passage, drops. This hampers the function of the catalyst to purify exhaust gas. To solve this problem, an exhaust emission purification controller described in Patent Document 1 performs bed temperature control, in which unburned fuel is added to exhaust gas by opening a fuel adding valve, which is provided in an exhaust passage, when the temperature of the exhaust gas decreases. In other words, the controller forcibly increases the temperature of the exhaust gas through such bed temperature control.

The controller of the aforementioned document stores a learned value of the addition amount of the unburned fuel for each one of various types of operating ranges of the internal combustion engine in order to correct the difference between the bed temperature and a target catalyst bed temperature at the time when the bed temperature control is carried out. The controller reflects the learned value in the addition amount of the fuel.

The learned value is obtained under such conditions that the bed temperature control is currently carried out and the target bed temperature is greater than or equal to a predetermined value. The learned value is determined from the difference between the actual fuel supply amount and the estimated fuel supply amount. The actual fuel supply amount is the amount of the fuel supplied to the exhaust gas purifying catalyst. The estimated fuel supply amount is the amount of the fuel that has actually contributed to rise of the catalyst bed temperature.

The learned value is also learned when the catalyst bed temperature. That is, the learned value includes a component for correcting change over time of the fuel adding valve and component for correcting compensation of the catalyst bed temperature. The component for correcting change over time of the fuel adding valve corrects an error of the fuel adding valve caused by change over time. The component for correcting compensation of the catalyst bed temperature corrects an error of the bed temperature with respect to the target catalyst bed temperature caused by the heat capacity of the exhaust gas purifying catalyst at the time when the catalyst bed temperature changes.

However, the exhaust emission purification controller of the aforementioned document does not separately learn the component for correcting change over time and the component for correcting compensation of the catalyst bed temperature. Patent Document 1: Japanese Laid-Open Patent Publication No. 2003-172185

SUMMARY OF THE INVENTION

Accordingly, it is an objective of the present invention to provide an exhaust emission purification controller of an internal combustion engine capable of separately learning and using an error caused by change over time of a fuel adding mechanism and an error of the bed temperature of an exhaust gas purifying catalyst caused by the heat capacity of the catalyst.

To achieve the foregoing objective and in accordance with one aspect of the present invention, an exhaust emission purification controller of an internal combustion engine is provided. The engine includes an exhaust passage and an exhaust gas purifying catalyst arranged in the exhaust passage. The controller performs a bed temperature control in which a bed temperature of the exhaust gas purifying catalyst is adjusted to a target bed temperature through addition of unburned fuel to exhaust gas. When carrying out the bed temperature control, the controller learns a learned value of an addition amount of the unburned fuel so as to correct a difference between the bed temperature, which is detected periodically, and the target bed temperature. The controller includes a determining section, a storage section, a reflecting section, and a control executing section. The determining section determines whether a flow of exhaust gas to the exhaust gas purifying catalyst is in a steady state. The storage section stores the learned value as a steady state learned value when the determining section determines that the flow of the exhaust gas is in the steady state, and stores the learned value as a transient state learned value when the determining section does not determine that the flow of the exhaust gas is in the steady state. The reflecting section reflects at least the transient state learned value out of the steady state learned value and the transient state learned value in the addition amount of fuel when the bed temperature control is carried out. The control executing section executes a control based only on the steady state learned value out of the steady state learned value and the transient state learned value.

DETAILED DESCRIPTION OF THE PREFERRED EMBODIMENTS

Figure 1:
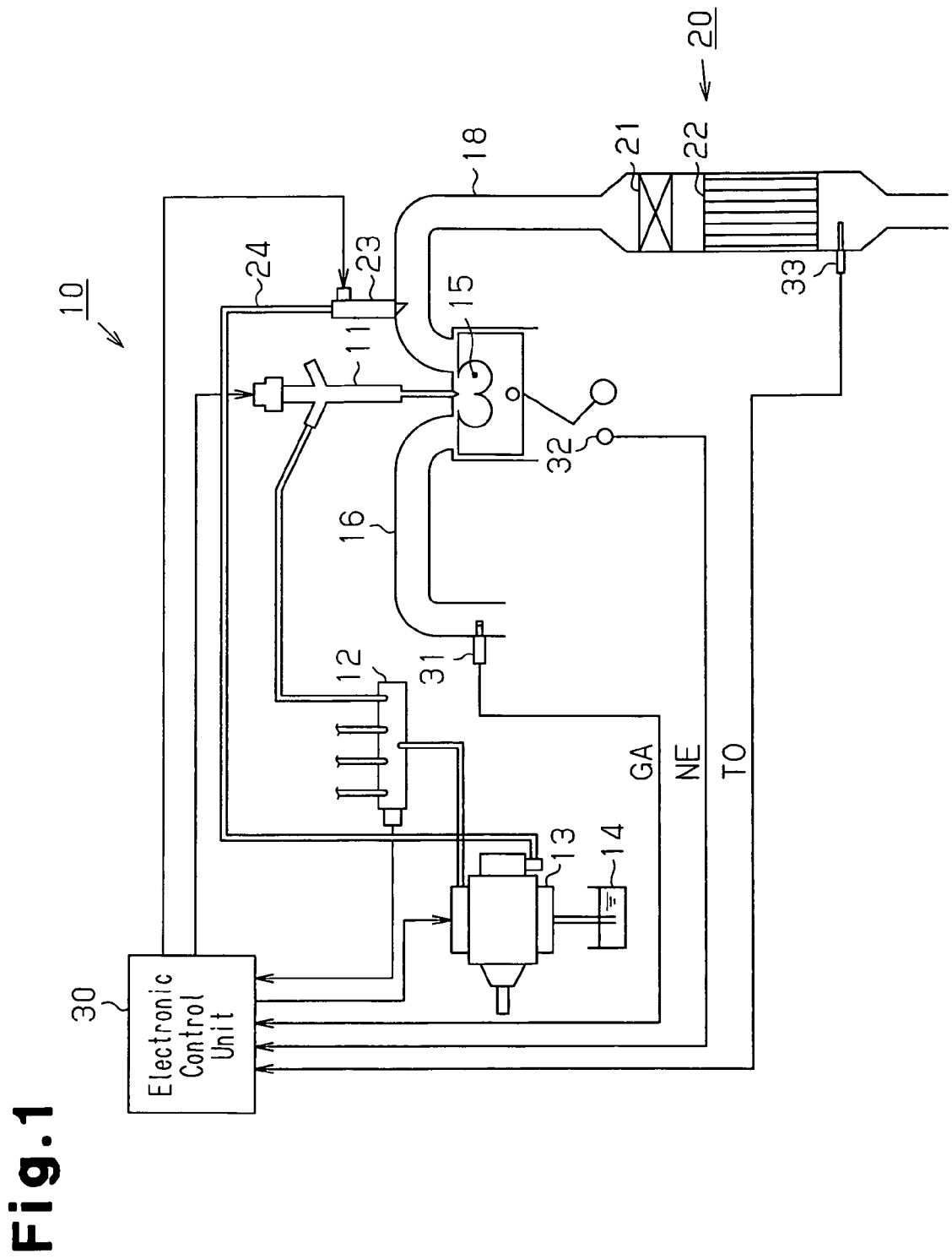
FIG. 1 is a diagram schematically showing an internal combustion engine having an exhaust emission purification controller according to one embodiment of the present invention.

FIGS. 1 to 11 illustrate one embodiment of the present invention. FIG. 1 shows an engine 10 serving as an internal combustion engine. The engine 10 has an electronic control unit, or an ECU 30, which serves as an exhaust emission purification controller. The engine 10 of the illustrated embodiment is a diesel engine.

As illustrated in FIG. 1, a fuel injection valve 11 is mounted in the engine 10. The fuel injection valve 11 is connected to a common rail 12, which retains high-pressure fuel. The common rail 12 is connected to a supply pump 13. The supply pump 13 draws fuel from a fuel tank 14 and sends the high-pressure fuel to the common rail 12 under pressure. The high-pressure fuel, which is retained in the common rail 12, is injected from the fuel injection valve 11 held in an open state into a combustion chamber 15.

An intake passage 16 and an exhaust passage 18 are connected to the combustion chamber 15. The combustion chamber 15 draws air through the intake passage 16.

Burned gas is discharged from the combustion chamber 15 to the exterior via the exhaust passage 18, which forms an exhaust system. The burned gas that has been sent from the combustion chamber 15 to the exhaust passage 18 is referred to as "exhaust gas". An exhaust gas purifying catalyst 20 serving as an exhaust gas purifying member is arranged in the exhaust passage 18. The exhaust gas is purified by the exhaust gas purifying catalyst 20 when passing through the exhaust gas purifying catalyst 20 and discharged to the exterior of the exhaust passage 18.

The exhaust gas purifying catalyst 20 has an NSR catalyst 21 and a DPF 22. The NSR catalyst 21 is an NOx storage reduction catalyst for removing NOx from exhaust gas. The DPF 22 is a filter for collecting PM, which is particulate matter, from the exhaust gas. In other words, the DPF 22 is a diesel particulate filter. The NSR catalyst 21 and the DPF 22 are arranged in series along the flow direction of the exhaust gas in the exhaust passage 18. The NSR catalyst 21 is arranged upstream from the DPF 22. The NSR catalyst 21 and the DPF 22 each function as an exhaust gas purifying catalyst. The DPF 22 is a porous ceramic structure. The PM in the exhaust gas is collected by the DPF 22 when passing through the walls formed by the pores of the DPF 22.

A fuel adding valve 23 is arranged in a portion of the exhaust passage 18 upstream from the NSR catalyst 21. The fuel adding valve 23 is connected to the supply pump 13 through a fuel supply pipe 24. The supply pump 13 injects the fuel into the exhaust passage 18 through the fuel adding valve 23 when the fuel adding valve 23 is open. The fuel is thus added to the exhaust gas.

The amount per unit time of the fuel injected from the fuel injection valve 11 so that the fuel is burned in the combustion chamber 15 to produce engine torque is referred to as the fuel injection amount Q. The amount per unit time of unburned fuel added to the exhaust gas purifying catalyst 20 is referred to as the fuel addition amount Qr. The fuel addition amount Qr is achieved by addition of fuel through the fuel adding valve 23 or post injection through the fuel injection valve 11. The post injection is reinjection of a small amount of fuel through the fuel injection valve 11 after fuel has been injected from the fuel injection valve 11 to produce the engine torque. In other words, addition of unburned fuel to the exhaust gas for PM removal control of the DPF 22 may be carried out through both of the fuel adding valve 23 and the fuel injection valve 11.

The fuel adding valve 23 and the supply pump 13 form a first fuel adding portion. The fuel injection valve 11, the common rail 12, and the supply pump 13 form a second fuel adding portion. Specifically, the first fuel adding portion includes the fuel adding valve 23 and a mechanism that supplies fuel to the fuel adding valve 23. The second fuel adding portion includes the fuel injection valve 11 and a mechanism that supplies fuel to the fuel injection valve 11. Both of the first fuel adding portion and the second fuel adding portion are a fuel adding mechanism that adds unburned fuel to the exhaust gas. In other words, the first fuel adding portion has the fuel adding valve 23 arranged in the exhaust passage 18. The second fuel adding portion is formed by a mechanism other than the first fuel adding portion.

The engine 10 includes an air flowmeter 31, an engine speed sensor 32, and an exhaust gas temperature sensor 33. The air flowmeter 31 detects an intake air amount GA. The engine speed sensor 32 detects an engine speed NE. The exhaust gas temperature sensor 33 detects an exhaust gas temperature Ta. In other words, these sensors detect the operating state of the engine 10. The intake air amount GA is the amount of the air drawn from the intake passage 16 into the combustion chamber 15. The engine speed NE is the rotational speed of the output shaft of the engine 10. The exhaust gas temperature Ta is the temperature of the exhaust gas immediately after the exhaust gas has passed through the DPF 22.

Output signals of the air flowmeter 31, the engine speed sensor 32, and the exhaust gas temperature sensor 33 are each input to the ECU 30 as the electronic control unit. The ECU 30 functions as an exhaust emission purification controller of the engine 10. The ECU 30 has a microcomputer. The microcomputer includes a CPU, an ROM, an RAM, a timer-counter, an input interface, and an output interface. The CPU is a central processing unit. The ROM is a read-only memory that memorizes various programs and maps in advance. The RAM is a random access memory that temporarily stores results of calculation by the CPU.

The ECU 30 performs various types of calculation based on the output signals of the sensors. The ECU 30 then performs various types of control on the engine 10 based on the results of calculation. The various types of control of the ECU 30 include PM removal control, sulfur poisoning elimination control, and NOx storage-reduction control. The ECU 30 controls the fuel injection valve 11, the supply pump 13, and the fuel adding valve 23. The ECU 30 controls the fuel adding valve 23 each in the PM removal control, the sulfur poisoning elimination control, and the NOx storage-reduction control. These types of control are performed not simultaneously but at separate desirable timings and under separate performing conditions.

Figure 2:
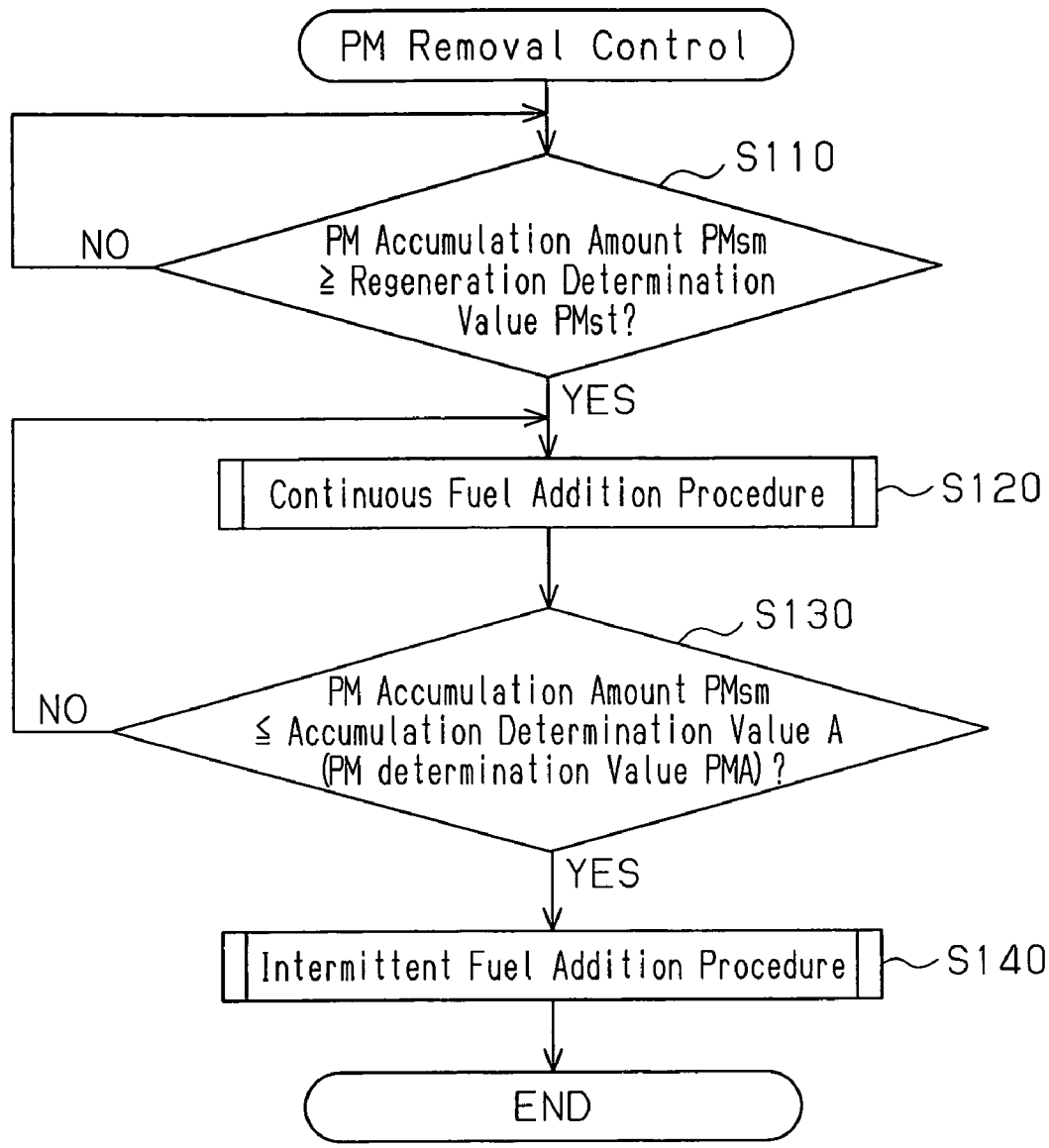
FIG. 2 is a flowchart representing PM removal control performed by the controller illustrated in FIG. 1.
Figure 3:
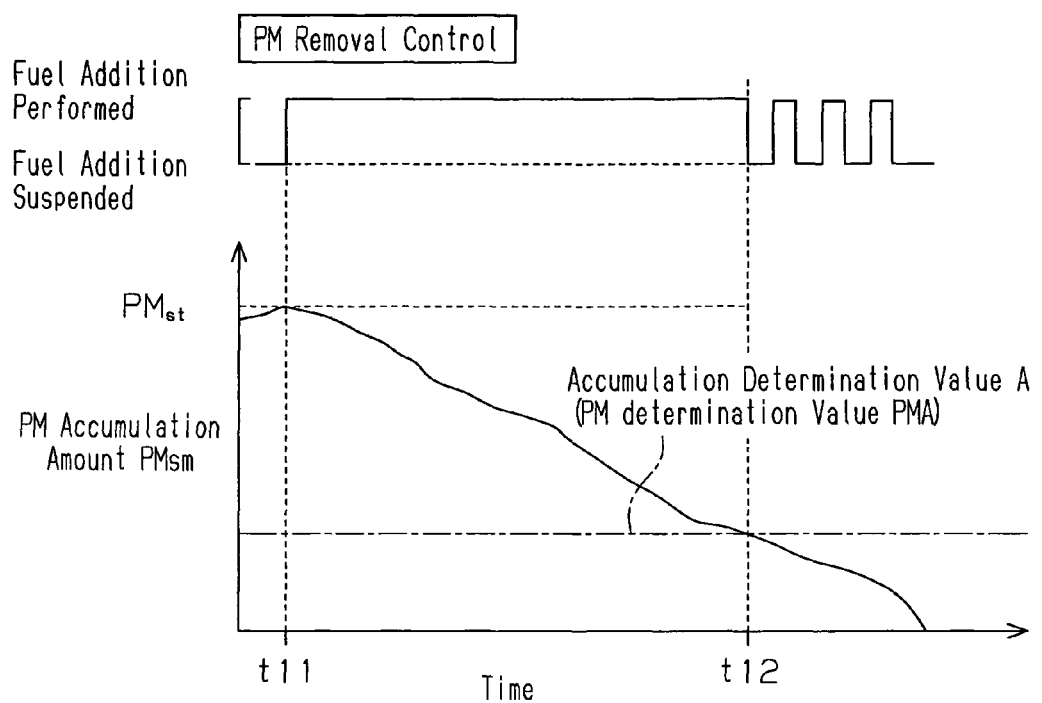
FIG. 3 is a timing chart representing the amount of PM accumulated on the DPF illustrated in FIG. 1.

FIGS. 2 and 3 represent the PM removal control of the DPF 22 performed by the ECU 30. FIG. 2 represents steps S110 to S140 of the PM removal control. The PM accumulated on the DPF 22 is burned through the PM removal control and discharged in the forms of carbon dioxide ($CO_2$) and water ($H_2O$). This unclogs the DPF 22, and the DPF 22 is regenerated. The ECU 30 oxidizes the fuel in the exhaust gas or on the DPF 22 by adding unburned fuel to the exhaust gas. The heat generated through such oxidization raises the temperature, which is the bed temperature, of the DPF 22 to a high level, for example, to a temperature between 600° C. and 700° C. As a result, the PM accumulated on the DPF 22 is burned.

FIG. 3 represents change of the PM accumulation amount PMsm of the DPF 22. The PM accumulation amount PMsm represents the amount of the PM accumulated on the DPF 22.

With reference to FIG. 2, in step S110, the ECU 30 determines whether the PM accumulation amount PMsm has reached a regeneration determination value PMst. If the determination is positive in step S110, in other words, if the PM accumulation amount PMsm has reached the regeneration determination value PMst, the ECU 30 starts continuous fuel addition to exhaust gas through the fuel adding valve 23 in step S120. This increases the bed temperature of the DPF 22, thus burning the PM accumulated on the DPF 22. In other words, as represented at the time points t11 to t12 in FIG. 3, the PM accumulation amount PMsm gradually decreases.

To calculate the PM accumulation amount PMsm, the ECU 30 performs calculation based on the operating state of the engine 10 or estimates the PM discharge amount or the PM oxidization amount per unit time of the engine 10 or selectively adds and subtracts the PM discharge amount and PM oxidization amount per unit time as needed.

In step S130, the ECU 30 determines whether the PM accumulation amount PMsm is smaller than or equal to a PM determination value PMA. If the determination is positive in step S130, in other words, if the PM accumulation amount PMsm is smaller than or equal to the PM determination value PMA, the ECU 30 performs intermittent fuel addition to exhaust gas through the fuel adding valve 23 in step S140. As represented in the period of time since the time point t12, fuel addition to the exhaust gas through the fuel adding valve 23 is carried out repeatedly and intermittently in the intermittent fuel adding. Specifically, the intermittent fuel addition is achieved by selectively repeating and suspending the fuel addition at certain cycles. The accumulated PM that has remained on the DPF 22 after the continuous fuel addition is thus completely burned out and removed through the intermittent fuel addition. After the intermittent fuel addition, the PM removal procedure is ended.

Figure 4:
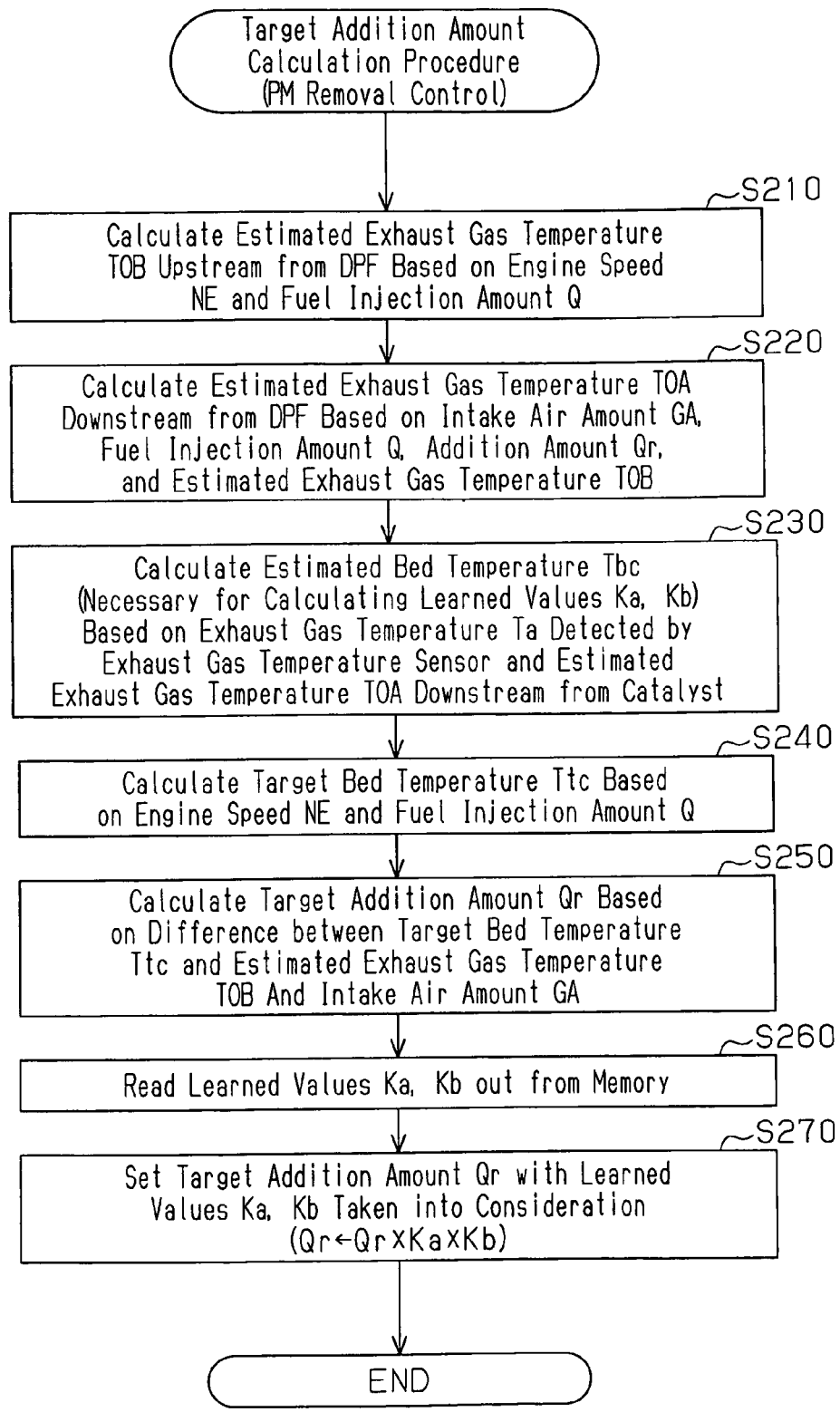
FIG. 4 is a flowchart representing calculation of a target fuel addition amount of the PM removal control performed by the controller of FIG. 1.

FIG. 4 represents steps S210 to S270 of calculation of a first target addition amount Qr1 of the PM removal control. The first target addition amount Qr1 is a control target of the fuel addition amount Qr for the continuous fuel addition of the PM removal control.

In step S210, the ECU 30 calculates an estimated exhaust gas temperature TOB as an estimated upstream exhaust gas temperature based on the engine speed NE and the fuel injection amount Q. The estimated exhaust gas temperature TOB is an estimated value of the exhaust gas temperature in the portion of the exhaust passage 18 upstream from the DPF 22.

In step S220, the ECU 30 calculates an estimated downstream exhaust gas temperature TOA based on the estimated exhaust gas temperature TOB, the fuel injection amount Q, the first target addition amount Qr1, and the intake air amount GA. The intake air amount GA is an indicator value of the flow rate of the exhaust gas. The estimated downstream exhaust gas temperature TOA is an estimated value of the exhaust gas temperature in the portion of the exhaust passage 18 downstream from the DPF 22.

In step S230, the ECU 30 calculates an estimated bed temperature Tbc of the DPF 22 based on the exhaust gas temperature Ta and the estimated downstream exhaust gas temperature TOA. The estimated bed temperature Tbc is an estimated value of the bed temperature of the DPF 22.

In step S240, the ECU 30 calculates the target bed temperature Ttc of the DPF 22 based on the engine speed NE and the fuel injection amount Q. The target bed temperature Ttc is a control target of the bed temperature of the DPF 22.

In step S250, the ECU 30 obtains the first target addition amount Qr1 based on the difference between the target bed temperature Ttc and the estimated exhaust gas temperature TOB and the intake air amount GA.

In step S260, the ECU 30 reads a steady state learned value Ka and a transient state learned value Kb from the RAM. In the illustrated embodiment, the steady state learned value Ka and the transient state learned value Kb are learning coefficients by which the first target addition amount Qr1 is multiplied.

In step S270, the ECU 30 sets the final first target addition amount Qr1 by carrying out the following calculation: Qr1× Ka×Kb. Specifically, the first target addition amount Qr1 is set to a value reflecting the steady state learned value Ka and the transient state learned value Kb. In other words, the first target addition amount Qr1 is set to a value obtained with the steady state learned value Ka and the transient state learned value Kb taken into consideration. In the illustrated embodiment, the procedure of step S270 corresponds to a reflecting portion that reflects the transient state learned value Kb to the first target addition amount Qr1.

In the continuous fuel addition of the PM removal control, the ECU 30 controls the fuel adding valve 23 in such a manner that the bed temperature of the DPF 22 becomes the target bed temperature Ttc. Specifically, the ECU 30 controls the fuel adding valve 23 in such a manner that the addition amount Qr becomes the first target addition amount Qr1. In the continuous fuel addition, the fuel adding valve 23 is repeatedly switched between an open state and a closed state alternately at extremely short cycles. The ECU 30 sets the ratio between the opening time and the closing time of the fuel adding valve 23 in correspondence with the first target addition amount Qr1. For example, the ECU 30 adjusts the fuel addition amount Qr by variably setting the opening time of the fuel adding valve 23. As a result, the ECU 30 is allowed to raise the bed temperature of the DPF 22 at a desired speed to a such a temperature that the accumulated PM is burnable.

In the intermittent fuel addition of the PM removal control, the ECU 30 repeats the opening time and the closing time of the fuel adding valve 23 alternately at extremely short cycles. The ECU 30 adjusts the fuel addition amount Qr by setting the opening time of the fuel adding valve 23.

The PM removal control may be carried out by performing both of the fuel addition through the fuel adding valve 23 and the post injection through the fuel injection valve 11. In the post injection, the ECU 30 controls the fuel adding valve 23 and the fuel injection valve 11 in such a manner that the sum of the fuel addition amount by the fuel adding valve 23 and the fuel addition amount through the post injection becomes the first target addition amount Qr1.

Figure 5:
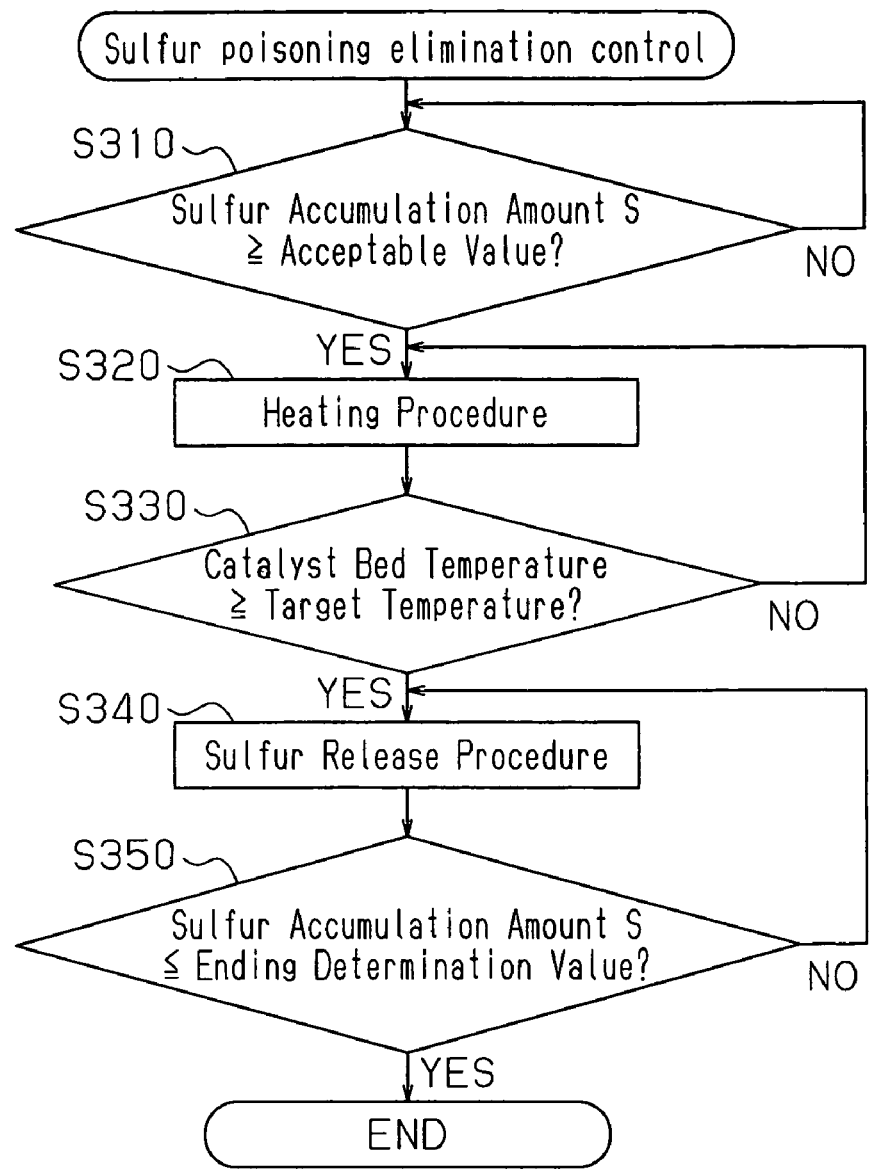
FIG. 5 is a flowchart representing sulfur poisoning elimination control carried out by the controller of FIG. 1.
Figure 6:
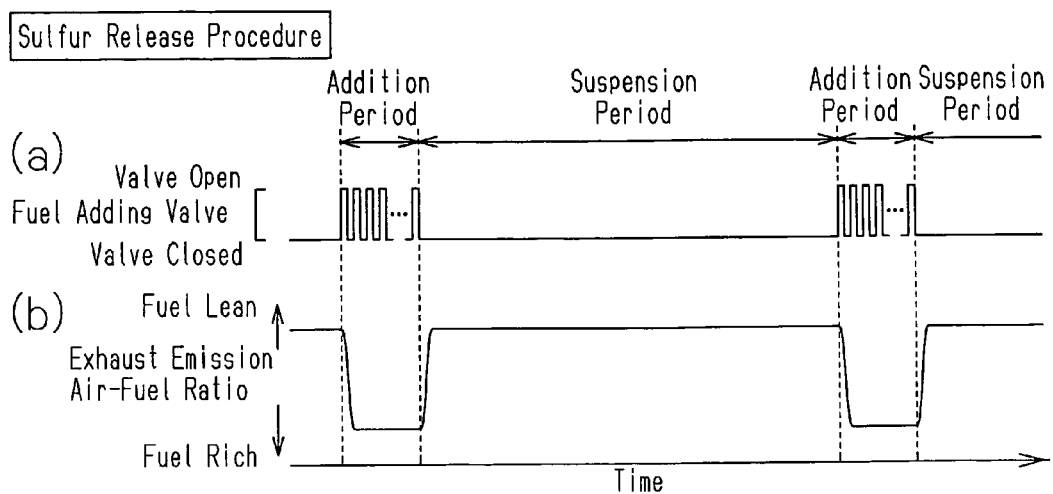
FIGS. 6(a) and 6(b) are timing charts representing a sulfur release procedure.

FIG. 5 represents steps S310 to S350 of the sulfur poisoning elimination control.

The NSR catalyst 21 is poisoned by sulfur contained in the fuel, which lowers the NOx storage performance of the NSR catalyst 21. In the sulfur poisoning elimination control by the ECU 30, the ECU 30 recovers the NOx storage performance of the NSR catalyst 21 by selectively releasing and reducing the stored sulfur, which is an sulfur oxide SOx, from the NSR catalyst 21.

As illustrated in FIG. 5, the ECU 30 determines, in step S310, whether a sulfur accumulation amount S of the NSR catalyst 21 is greater than or equal to an acceptable value. If the determination is positive in step S310, in other words, if the sulfur accumulation amount S of the NSR catalyst 21 is greater than or equal to the acceptable value, the ECU 30 starts a heating procedure of the NSR catalyst 21 in step S320. The heating procedure of the NSR catalyst 21 is performed in a manner similar to the continuous fuel addition of the PM removal control of the DPF 22. Specifically, in the heating procedure of the NSR catalyst 21, the fuel is continuously added to the exhaust gas through the fuel adding valve 23. The bed temperature of the NSR catalyst 21 is thus raised to such a temperature that the sulfur can be released, for example, to 700° C.

To determine the sulfur accumulation amount S, the ECU 30 performs calculation based on the operating state of the engine 10, estimates the amount of the accumulated sulfur that has been released from the NSR catalyst 21, or selectively adds and subtracts the sulfur accumulation amount and release amount per unit time as needed.

In step S330, the ECU 30 determines whether the bed temperature of the NSR catalyst 21 is greater than or equal to a target value. If the determination of step S330 is positive, in other words, if the bed temperature of the NSR catalyst 21 is greater than or equal to the target value, the ECU 30 starts a sulfur release procedure by which the accumulated sulfur is released from the NSR catalyst 21 in step S340.

To carry out the sulfur release procedure, the ECU 30 creates a reduction atmosphere for the exhaust gas by adding the fuel to the exhaust gas. Specifically, the oxygen concentration of the exhaust gas is lowered with respect to a predetermined level. As a result, the accumulated sulfur in the NSR catalyst 21 is reduced and released from the NSR catalyst 21. This purifies the NSR catalyst 21.

In step S350, the ECU 30 determines whether the sulfur accumulation amount S of the NSR catalyst 21 is smaller than or equal to an ending determination value. If the determination is positive in step S350, the ECU 30 ends the sulfur release procedure.

FIG. 6(a) represents change of the fuel adding valve 23 between the open state and the closed state in the sulfur release procedure. FIG. 6(b) represents the air-fuel ratio of the exhaust gas in the sulfur release procedure. Specifically, FIG. 6(b) represents the oxygen concentration of the exhaust gas flowing into the NSR catalyst 21 in the sulfur release procedure.

With reference to FIGS. 6(a) and 6(b), in the sulfur release procedure, a fuel addition period in which the fuel is added to the exhaust gas and a suspension period are repeatedly brought about alternately. In the fuel addition period, as illustrated in FIG. 6(a), the fuel is added intermittently. As a result, with the oxygen concentration of the exhaust gas maintained lower than a predetermined level, carbon hydride and carbon monoxide, which are reducing agents, are supplied to the NSR catalyst 21. This promotes reduction and removal of the accumulated sulfur of the NSR catalyst 21. The suspension periods of the fuel addition in the sulfur release procedure prevent excessive increase of the bed temperature of the NSR catalyst 21.

In the sulfur release procedure, the ECU 30 sets the second target addition amount Qr2 based on the bed temperature of the NSR catalyst 21. The second target addition amount Qr2 is a target value of the fuel addition amount through the fuel adding valve 23. The second target addition amount Qr becomes smaller as the bed temperature of the NSR catalyst 21 becomes higher. The second target addition amount Qr2 is set to a value reflecting the steady state learned value Ka and the transient state learned value Kb. Specifically, the calculation Qr2×Ka×Kb is performed. The bed temperature of the NSR catalyst 21 is calculated by the ECU 30 when necessary based on the operating state of the engine 10 and the fuel addition amount through the fuel adding valve 23.

In each fuel addition period of the sulfur release procedure, the fuel adding valve 23 is repeatedly switched between the open state and the closed state alternately at extremely short cycles. For example, the opening time of the fuel adding valve 23 is variably set. In other words, the ratio between the opening time and the closing time of the fuel adding valve 23 is set in correspondence with the second target addition amount Qr2.

Figure 7:
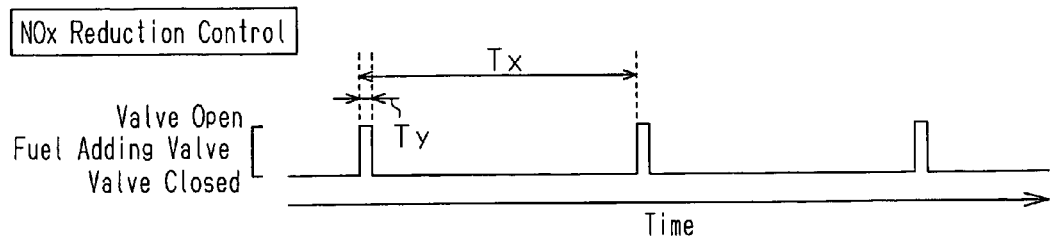
FIG. 7 is a timing chart representing NOx reduction control.

FIG. 7 represents NOx reduction control of the NSR catalyst 21.

The NOx stored in the NSR catalyst 21 is reduced through the NOx reduction control. As a result, the stored NOx is changed to the forms of nitrogen, carbon dioxide, and water and released from the NSR catalyst 21.

With reference to FIG. 7, in the NOx reduction control, the fuel adding valve 23 is maintained in the open state for the opening time Ty at fixed periods Tx. As a result, the unburned fuel in the exhaust gas passing through the NSR catalyst 21 temporarily increases. In other words, the oxygen concentration of the exhaust gas flowing through the NSR catalyst 21 is temporarily held at a low level. This promotes release of NOx from the NSR catalyst 21 and reduction of NOx in the NSR catalyst 21.

In the NOx reduction control, the ECU 30 sets a third target addition amount Qr3. The third target addition amount Qr3 is a target value of the fuel addition amount through the fuel adding valve 23 in the NOx reduction control. The third target addition amount Qr3 is set based on the fuel injection amount Q and the intake air amount GA. The third target addition amount Qr3 is set in such a manner that the oxygen concentration of the exhaust gas becomes lower than a predetermined level. The third target addition amount Qr3 is calculated in such a manner as to reflect the steady state learned value Ka. Specifically, the ECU 30 performs the calculation Qr3×Ka. The opening time Ty is set in correspondence with the third target addition amount Qr3. In other words, by maintaining the fuel adding valve 23 in the open state for the opening time Ty, the oxygen concentration of the exhaust gas is lowered below the predetermined level.

In this manner, the fuel adding valve 23, which is arranged in the exhaust passage 18, carries out the PM removal control, the sulfur poisoning elimination control, and the NOx reduction control by adding the fuel to the exhaust gas. The exhaust gas purifying performance of the exhaust gas purifying catalyst 20 is thus regenerated and maintained in a desirable state.

Figure 8:
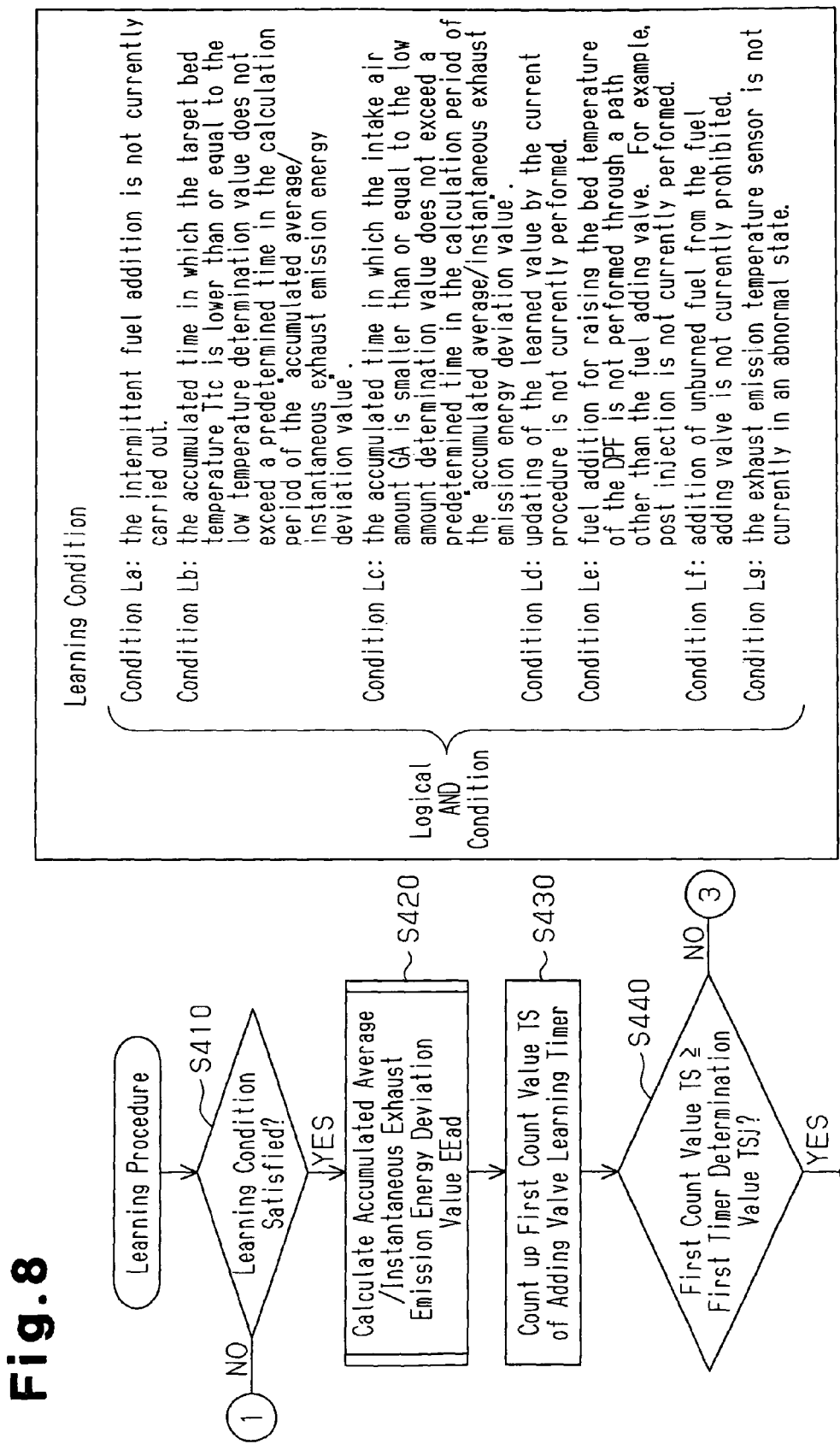
FIG. 8 is a flowchart representing a learning procedure performed by the controller of FIG. 1.
Figure 9:
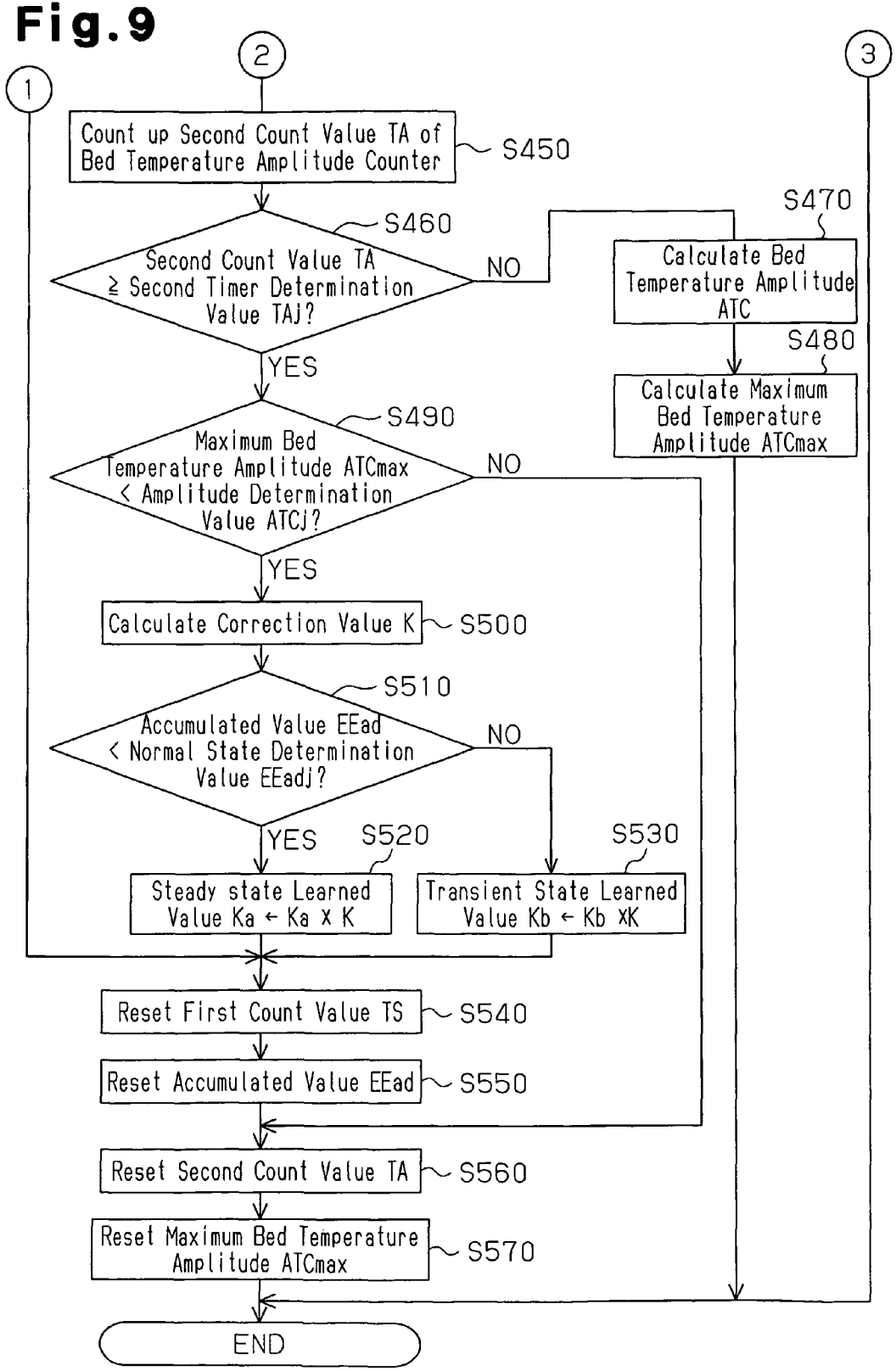
FIG. 9 is a flowchart representing a learning procedure performed after FIG. 8.

FIGS. 8 and 9 represent steps S410 to S570 of the learning procedure of the steady state learned value Ka and the transient state learned value Kb. In the illustrated embodiment, the ECU 30 learns the steady state learned value Ka and the transient state learned value Kb in order to correct the difference between the bed temperature of the DPF 22 and the target bed temperature Ttc at the time when the PM regeneration control is carried out. The ECU 30 performs the learning procedure at predetermined cycles.

With reference to FIG. 8, in step S410, the ECU 30 determines whether a learning condition for carrying out the learning procedure is satisfied. Specifically, it is determined whether the learning condition is satisfied based on the logical multiplication of learning conditions La to Lg, in other words, on an AND condition.

The learning conditions La to Lg and the reasons La1 to Lg1 why the corresponding learning conditions La to Lg are set will be described below.

Learning Condition La: The intermittent fuel addition of the PM removal control is not being carried out at the current point of time.

Reason La1: The exhaust gas temperature or the bed temperature of the DPF 22 may change when the intermittent fuel addition of the PM removal control is being carried out. However, the ECU 30 is incapable of determining whether the change of the exhaust gas temperature or the bed temperature of the DPF 22 has been caused by the continuous fuel addition or the intermittent fuel addition. In other words, when the intermittent fuel addition of the PM removal control is performed, it is difficult for the ECU 30 to learn an appropriate steady state learned value Ka and an appropriate transient state learned value Kb. This problem is avoided by setting the learning condition La.

Learning Condition Lb: The accumulated time in which the target bed temperature Ttc is smaller than or equal to a low temperature determination value does not exceed a predetermined time when an energy deviation accumulated value EEad is calculated.

Reason Lb1: The calculation accuracy of the estimated bed temperature Tbc decreases when the actual bed temperature of the DPF 22 is lower than or equal to a low temperature determination value. Accordingly, when the target bed temperature Ttc is continuously lower than or equal to the low temperature determination value, the bed temperature of the DPF 22 may also become lower than or equal to the low temperature determination value and thus the calculation accuracy of the estimated bed temperature Tbc may be lowered. In this case, it is difficult for the ECU 30 to learn an appropriate steady state learned value Ka and an appropriate transient state learned value Kb. This problem is avoided by setting the learning condition Lb.

Learning Condition Lc: The accumulated time in which the intake air amount GA is smaller than or equal to a low amount determination value does not exceed a predetermined time in the period in which the energy deviation accumulated value EEad is calculated.

Reason Lc1: The accuracy of calculation of the estimated exhaust gas temperature TOB by the ECU 30 decreases when the flow rate of the exhaust gas is smaller than or equal to a low amount determination value. Accordingly, when the intake air amount GA, which is the indicator of the flow rate of the exhaust gas, is continuously smaller than or equal to a low amount determination value, the calculation accuracy of the estimated exhaust gas temperature TOB decreases. This makes it difficult for the ECU 30 to learn an appropriate steady state learned value Ka and an appropriate transient state learned value Kb. This problem is avoided by setting the learning condition Lc.

Learning Condition Ld: Updating of the steady state learned value Ka and the transient state learned value Kb is not carried out at the current point of time.

Reason Ld1: When the steady state learned value Ka and the transient state learned value Kb are updated, the fuel addition amount through the fuel adding valve 23 may rapidly change, thus rapidly changing the bed temperature of the DPF 22. In this case, it is difficult for the ECU 30 to learn an appropriate steady state learned value Ka and an appropriate transient state learned value Kb. This problem is avoided by setting the learning condition Ld.

The ECU 30 determines whether the logical AND condition including the learning conditions La to Ld are satisfied from the following reason. In the PM removal control of the diesel engine, the learned value is calculated normally from the difference between the actual fuel supply amount and the estimated fuel supply amount. The actual fuel supply amount is the amount of the fuel supplied from the fuel addition mechanism to the DPF 22. The fuel addition mechanism includes the fuel adding valve 23 and the fuel injection valve 11, which performs the post injection. The estimated fuel supply amount is the amount of the fuel that has actually contributed to rise of the bed temperature of the DPF 22. The actual fuel supply amount and the estimated fuel supply amount are calculated based on the target bed temperature Ttc, the estimated exhaust gas temperature TOB, which is an estimated value of the temperature of the exhaust gas flowing in the exhaust passage 18, the estimated bed temperature Tbc, which is the estimated temperature of the DPF 22, and the flow rate of the exhaust gas in the exhaust passage 18.

In order for the ECU 30 to learn the steady state learned value Ka and the transient state learned value Kb appropriately, it is important to obtain the estimated bed temperature Tbc and the estimated exhaust gas temperature TOB with high accuracy. However, when the exhaust gas temperature or the flow rate of the exhaust gas greatly changes, in other words, when distribution of the exhaust gas temperature or the bed temperature of the exhaust gas purifying catalyst 20 is greatly varied, it is difficult to model the situation. In this case, the calculation accuracy of the estimated bed temperature Tbc or the estimated exhaust gas temperature TOB greatly decreases. This makes it difficult to appropriately learn the steady state learned value Ka and the transient state learned value Kb.

Accordingly, the ECU 30 determines whether the logical AND condition including the learning conditions La to Ld is satisfied. When the learning conditions La to Ld are met, the estimated exhaust temperature TOB and the bed temperature of the DPF 22 are comparatively stable. This allows the ECU 30 to appropriately learn the steady state learned value Ka and the transient state learned value Kb.

Learning Condition Le: The fuel addition for raising the bed temperature of the DPF 22 is not currently carried out by means other than the fuel adding valve 23. For example, the post injection is not currently performed. In other words, the fuel addition for increasing the bed temperature of the DPF 22 is currently carried out only through the first fuel adding portion including the fuel adding valve 23 but not through the second fuel adding portion including the fuel injection valve 11.

Reason Le1: To accurately adjust the fuel addition amount through the fuel adding valve 23, there is demand that an error of the addition amount through the fuel adding valve 23, which is caused by change over time of the fuel adding valve 23 and individual variability of the fuel adding valve 23, be learned. The change over time of the fuel adding valve 23 may be, for example, increased clogging of the nozzle of the fuel adding valve 23. However, for example, if the exhaust gas temperature or the bed temperature of the DPF 22 changes when the post injection is performed, the ECU 30 cannot determine whether the fuel addition that has caused the change in the exhaust gas temperature or the bed temperature of the DPF 22 was brought about by the fuel adding valve 23 or through the post injection. This prevents the ECU 30 from accurately learn an error of the addition amount of the fuel adding valve 23. This problem is avoided by setting the learning condition Le.

Learning Condition Lf: The addition of the unburned fuel through the fuel adding valve 23 is not currently prohibited.

Reason Lf1: If addition of the unburned fuel through the fuel adding valve 23 is prohibited, it is difficult for the ECU 30 to learn an appropriate learned value. This problem is avoided by setting the learning condition Lf.

In other words, the learned value at the time when the learning conditions Le and Lf are satisfied corresponds to that of the case in which the unburned fuel is added only through the fuel adding valve 23. This allows the ECU 30 to appropriately learn the steady state learned value Ka, by which an error of the addition amount of the fuel adding valve 23 is compensated.

Learning Condition Lg: The exhaust gas temperature sensor 33 is not in an abnormal state.

Reason Lg1: The steady state learned value Ka and the transient state learned value Kb are learned based on the exhaust gas temperature. Ta, which is detected by the exhaust gas temperature sensor 33 arranged in the exhaust passage 18. Accordingly, when the exhaust gas temperature sensor 33 is in the abnormal state, it is difficult for the ECU 30 to learn an appropriate steady state learned value Ka and an appropriate transient state learned value Kb. This problem is avoided by setting the learning condition Lg.

If the determination is negative in step S410 of FIG. 8, in other words, if any one of the learning conditions La to Lg is not satisfied; the ECU 30 suspends the current procedure without calculating the steady state learned value Ka or the transient state learned value Kb.

If positive determination is made in step S410, in other words, if the learning conditions La to Lg are all satisfied, the ECU 30 calculate the energy deviation accumulated value EEad in step S420. The ECU 30 then performs steps S421 to S426 illustrated in FIG. 10. The energy deviation accumulated value EEad is an accumulated exhaust gas energy deviation value, which is an accumulated value of the difference between an instantaneous exhaust gas energy EEm and an average exhaust gas energy EEa.

Figure 10:
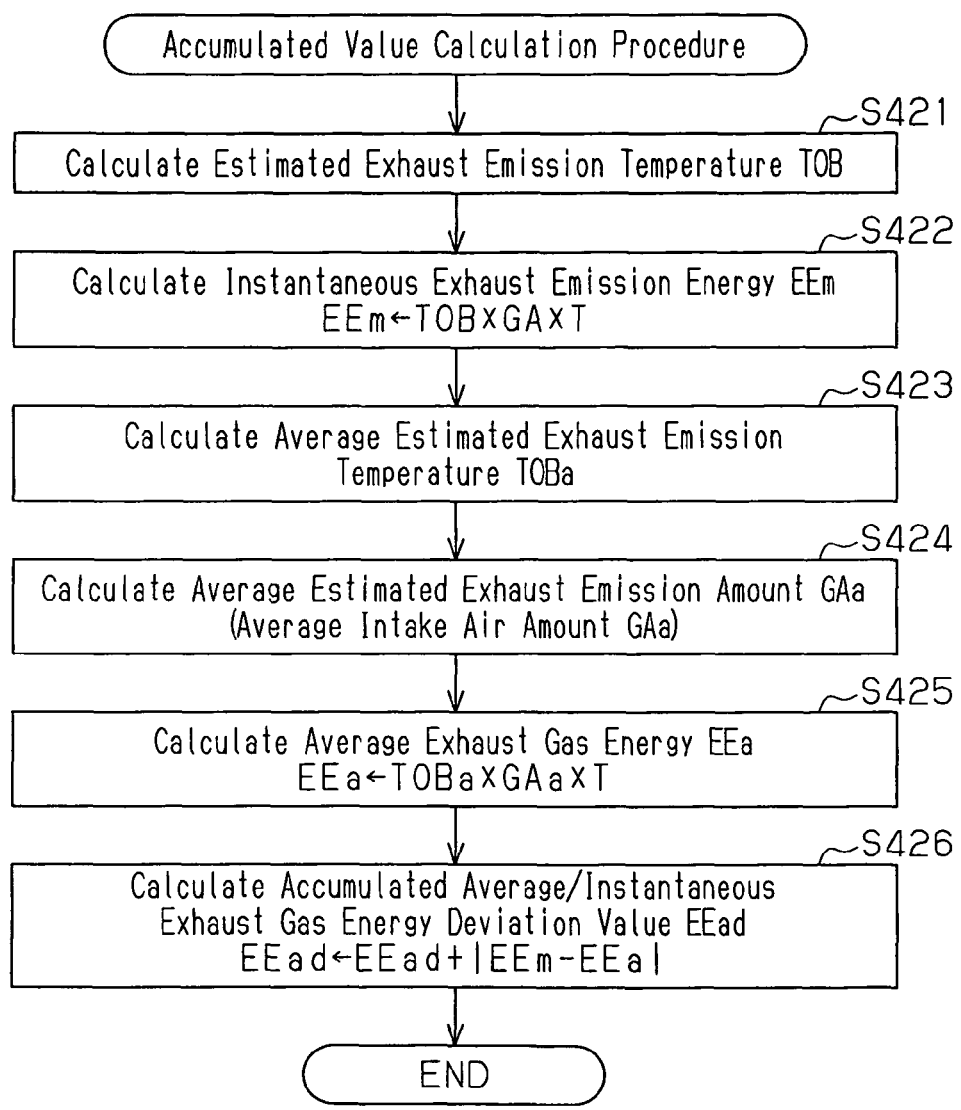
FIG. 10 is a flowchart representing calculation of an accumulated value of an exhaust gas energy deviation performed by the controller of FIG. 1.

FIG. 10 represents steps S421 to S426 of a calculation procedure of the energy deviation accumulated value EEad.

In step S421, the ECU 30 calculates the estimated exhaust gas temperature TOB. In step S422, the ECU 30 obtains the instantaneous exhaust gas energy EEm based on the estimated exhaust gas temperature TOB, the intake air amount GA, and a calculation cycle T of the calculation procedure. The instantaneous exhaust gas energy EEm is determined by the relational expression (1) below. Specifically, the instantaneous exhaust gas energy EEm is the instantaneous value of the exhaust gas energy. The calculation cycle T is approximately 0.1 ms to 0.2 ms.

$$EEm \leftarrow TOB \times GA \times T \qquad \text{Relational Expression (1)}$$

In step S423, the ECU 30 calculates an average estimated exhaust gas temperature TOBa. The average estimated exhaust gas temperature TOBa is a time average of the estimated exhaust gas temperature TOB since the time point at which the learning conditions La to Lg are satisfied. FIG. 11(a) illustrates examples of change of the estimated exhaust gas temperature TOB and change of the average estimated exhaust gas temperature TOBa since the learning conditions La to Lg are met. In the case illustrated in FIG. 11(a), the time point t12 is the time point at which the learning conditions La to Lg are satisfied. The ECU 30 calculates the estimated exhaust gas temperature TOB at every point of time since the time point t21. In other words, the ECU 30 periodically calculates the estimated exhaust gas temperature TOB. The ECU 30 sequentially obtains the average estimated exhaust gas temperature TOBa based on the estimated exhaust gas temperature TOB.

With reference to FIG. 10, in step S424, the ECU 30 calculates an average intake air amount GAa since the time point at which the learning conditions La to Lg are met. The average intake air amount GAa is the average of the flow rate of the exhaust gas, which is the average of the intake air amount GA, since the learning conditions La to Lg are satisfied. FIG. 11(b) illustrates examples of change of the intake air amount GA and change of the average intake air amount GAa since the time point at which the learning conditions La to Lg are met. As illustrated in FIG. 11(b), the ECU 30 periodically calculates the intake air amount GA since the time point t21 and sequentially obtains the average intake air amount GAa based on the intake air amount GA.

In step S425, the ECU 30 calculates an average exhaust gas energy EEa based on the average exhaust gas temperature TOBa, the average intake air amount GAa, and the calculation cycle T of the calculation procedure. The average exhaust gas energy EEa is obtained by the relational expression (2) shown below. Specifically, the average exhaust gas energy EEa is the average of the exhaust gas energy determined from the exhaust gas temperature and the flow rate of the exhaust gas.

$$EEa \leftarrow TOBa \times GAa \times T \qquad \text{Relational Expression (2)}$$

As has been described, the ECU 30 calculates the instantaneous exhaust gas energy EEm using the relational expression (1) and the average exhaust gas energy EEa using the relational expression (2). This minimizes the load of calculation of the ECU 30 for determining the energy deviation accumulated value EEad. In other words, the calculation load of the ECU 30 is suppressed.

In step S426, the ECU 30 calculates the energy deviation accumulated value EEad based on the instantaneous exhaust gas energy EEm and the average exhaust gas energy EEa. The energy deviation accumulated value EEad may be refereed to as an average/instantaneous exhaust gas energy deviation accumulated value. The energy deviation accumulated value EEad is calculated by the following relational expression (3).

$$EEad(i) \leftarrow EEad(i-1) + |EEm(i) - EEa(i)| \qquad \text{Relational Expression (3)}$$

In the expression (3), (i) indicates that the value is from the current calculation cycle and (i−1) indicates that the value is from the previous calculation cycle.

FIG. 11(c) illustrates examples of change of the instantaneous exhaust gas energy EEm and change of the average exhaust gas energy EEa. The ECU 30 starts to calculate the average exhaust gas energy EEa at the time point t21, at which the learning conditions La to Lg are satisfied. Also, the ECU 30 calculates the deviation VA between the average exhaust gas energy EEa and the instantaneous exhaust gas energy EEm starting from the time point t21. The energy deviation accumulated value EEad, which is the accumulated value of the deviation VA, represents the size of the shaded area in FIG. 11(c). The ECU 30 periodically calculates the energy deviation accumulated value EEad. FIG. 11(d) illustrates an example of change of the energy deviation accumulated value EEad.

With reference to FIG. 8, in step S430, the ECU 30 increments a first count value TS. The first count value TS is a count value of an adding valve learning timer of the ECU 30. In step S440, the ECU 30 determines whether the first count value TS is greater than or equal to a first timer determination value TSj. The first timer determination value TSj is, for example, 60 seconds.

FIG. 11(e) illustrates an example of change of the first count value TS. With reference to FIG. 11(e), increment of the first count value TS is started at the time point t21, at which the learning conditions La to Lg are satisfied. The ECU 30 increases the first count value TS to the first timer determination value TSj. The first timer determination value TSj is determined and set in advance using a test result, as will be described below. Specifically, the first timer determination value TSj is set in such a manner that, even if a certain procedure has been carried out so that the bed temperature of the DPF 22 greatly changes, it is determined that the bed temperature of the DPF 22 becomes a value close to the target bed temperature Ttc when the first count value TS reaches the first timer determination value TSj. That is, when determination in step S440 is positive, the ECU 30 determines that the temperature of the DPF 22 is stable.

With reference to FIG. 9, when positive determination is made in step S440, which is, in other words, when the first count value TS is greater than or equal to the first timer determination value TSj, the ECU 30 performs step S450.

As illustrated in FIG. 9, in step S450, the ECU 30 starts to increment a second count value TA. The second count value TA is a count value of a bed temperature amplitude timer of the ECU 30. In step S460, the ECU 30 determines whether the second count value TA is greater than or equal to a second timer determination value TAj. The second timer determination value TAj is, for example, 30 seconds.

When determination is negative in step S460, in other words, when the second count value TA is smaller than the second timer determination value TAj, the ECU 30 calculates a bed temperature amplitude ATC in step S470. The bed temperature amplitude ATC is the difference between the maximum value and the minimum value of the estimated bed temperature Tbc. In step S480, the ECU 30 calculates and updates a maximum bed temperature amplitude ATCmax. The maximum bed temperature amplitude ATCmax is the maximum value of the bed temperature amplitude ATC of the DPF 22. The maximum bed temperature amplitude ATCmax is stored in the RAM. Specifically, the ECU 30 compares the bed temperature amplitude ATC with the maximum bed temperature amplitude ATCmax that has been stored in the previous calculation cycle. When the bed temperature amplitude ATC is greater than the maximum bed temperature amplitude ATCmax, the ECU 30 stores the bed temperature amplitude ATC as an update value of the maximum bed temperature amplitude ATCmax. Contrastingly, when the bed temperature amplitude ATC is smaller than the maximum bed temperature amplitude ATCmax, the ECU 30 does not change the maximum bed temperature amplitude ATCmax.

FIG. 11(f) illustrates an example of change of the second count value TA. With reference to FIG. 11(f), increment of the second count value TA is started at the time point t22. The time point t22 is the time point at which the first count value TS reaches the first timer determination value TSj. The time point t23 is the time point at which the second count value TA reaches the second timer determination value TAj. In the period from the time point t22 to the time point t23, the ECU 30 increments the second count value TA and calculates and updates the maximum bed temperature amplitude ATCmax by repeatedly carrying out steps S460 to S480.

When determination is positive in step S460, in other words, when the second count value TA is greater than or equal to the second timer determination value TAj, the ECU 30 determines whether the maximum bed temperature amplitude ATCmax is smaller than an amplitude determination value ATCj in step S490. That is, the ECU 30 determines whether the bed temperature of the DPF 22 is stable based on the maximum bed temperature amplitude ATCmax.

When determination of step S490 in FIG. 9 is positive, that is, the maximum bed temperature amplitude ATCmax is smaller than the amplitude determination value ATCj, the ECU 30 determines that the bed temperature of the DPF 22 is stable. In other words, the ECU 30 determines that the steady state learned value Ka and the transient state learned value Kb can be learned under comparatively stable conditions and learns the steady state learned value Ka and the transient state learned value Kb in steps S500 to 5530.

In step S500, the ECU 30 calculates a correction value K. The correction value K is a learned value by which the difference between the bed temperature of the DPF 22 and the target bed temperature Ttc is compensated. The ECU 30 obtains the correction value K using the relational expressions (4), (5), and (6) described below. First, the ECU 30 calculates a required heat generation amount CVD from the relational expression (4). The required heat generation amount CVD is the amount of the heat generation necessary for causing the bed temperature of the DPF 22 to become the target bed temperature Ttc. The required heat generation amount CVD is the amount of the heat generated through addition of the unburned fuel to the exhaust gas. The ECU 30 then obtains an estimated heat generation amount CVP using the relational expression (5). The estimated heat generation amount CVP corresponds to the amount of the heat that is actually generated through the addition of the unburned fuel to the exhaust gas. In the relational expressions (4) and (5), the conversion factor kc converts the unit of the temperature is converted into the unit of the heat amount.

$$CVD \leftarrow (\text{Target Bed Temperature } Ttc - \text{Estimated Exhaust Gas Temperature } TOB) \times \text{Intake Air Amount } GA \times kc \qquad \text{Relational Expression (4)}$$

$$CVP \leftarrow (\text{Estimated Bed Temperature } Tbc - \text{Estimated Exhaust Gas Temperature } TOB) \times \text{Intake Air Amount } GA \times kc \qquad \text{Relational Expression (5)}$$

In step S500, the ECU 30 calculates the correction value K by the relational expression (6) described below using the required heat generation amount CVD and the estimated heat generation amount CVP. In other words, the correction value K is used to compensate the difference between the required heat generation amount CVD and the estimated heat generation amount CVP.

$$K(i) \leftarrow (CVD - CVP)/CVP \times K(i-1) + 1 \qquad \text{Relational Expression (6)}$$

In the expression (6), (i) indicates that the value is from the current calculation cycle, and the value (i−1) indicates that the value is from the previous calculation cycle.

In step S510, the ECU 30 determines whether the energy deviation accumulated value EEad is smaller than a steady state determination value EEadj. The energy deviation accumulated value EEad is maintained as "0" when energy of the exhaust gas flowing in the exhaust passage 18 is constant. The energy deviation accumulated value EEad gradually increases when the exhaust gas energy changes. As the degree of change of the exhaust gas energy becomes greater, the energy deviation accumulated value EEad increases more rapidly. In step S510, the ECU 30 determines whether the flow of the exhaust gas in the exhaust passage 18 is in a steady state or a transient state, based on the energy deviation accumulated value EEad.

As has been described, it is effective to calculate the energy deviation accumulated value EEad, which is the accumulated value of the difference between the average exhaust gas energy EEa and the instantaneous exhaust gas energy EEm, in order to determine whether the flow of the exhaust gas to the exhaust gas purifying catalyst 20 is in the steady state or the transient state. When the energy deviation accumulated value EEad is smaller than the steady state determination value EEadj, the ECU 30 determines that the flow of the exhaust gas is in a steady state. When the energy deviation accumulated value EEad is greater than or equal to the steady state determination value EEadj, the ECU 30 determines that the flow of the exhaust gas is in a transient state. Accordingly, the ECU 30 is allowed to determine the flow state of the exhaust gas easily and with high accuracy.

If the determination of step S510 is positive, in other words, if the energy deviation accumulated value EEad is smaller than the steady state determination value EEadj, the ECU 30 determines that the energy deviation accumulated value EEad is small and the flow of the exhaust gas is in a steady state. In this case, in step S520, the ECU 30 stores the value obtained by multiplying the steady state learned value Ka by the correction value K as an update value of the steady state learned value Ka.

When the flow of the exhaust gas is in a steady state, there is substantially no delay of change in the bed temperature of the DPF 22 due to the heat capacity of the exhaust gas purifying catalyst 20. In other words, there is no substantially delay of change in the bed temperature of the DPF 22 since the time point at which the unburned fuel is added to the exhaust gas. In this case, the correction value K, which is determined by the relational expressions (4) to (6), is a value from which influence of an error caused by the delay of change in the temperature of the exhaust gas purifying catalyst 20 is maximally excluded. In other words, the correction value K is a value corresponding to an amount of error of the amount of the fuel added to the exhaust gas through the fuel adding valve 23. Accordingly, the steady state learned value Ka is learned in such a manner that the steady state learned value Ka becomes a value capable of correcting an error of the addition amount through the fuel adding valve 23.

When determination is negative in step S510, in other words, when the energy deviation accumulated value EEad is greater than or equal to the steady state determination value EEadj, the energy deviation accumulated value EEad is comparatively great. Accordingly, the ECU 30 determines that the flow of the exhaust gas is in a transient state. In this state, in step S530, the ECU 30 stores the value obtained by multiplying the transient state learned value Kb by the correction value K as an update value of the transient state learned value Kb.

Since the flow of the exhaust gas is in a transient state, there is a small delay of change in the bed temperature of the DPF 22 due to the heat capacity of the exhaust gas purifying catalyst 20. In this case, the correction value K, which is calculated by the relational expressions (4) to (6), is a value by which the delay of the change in the temperature of the exhaust gas purifying catalyst 20 can be corrected. Accordingly, the transient state learned value Kb is learned in such a manner that the transient state learned value Kb becomes a value capable of correcting an amount of error caused when the bed temperature of the DPF 22 becomes the target bed temperature Ttc. In other words, the transient state learned value Kb is learned in such a manner that the transient state learned value Kb becomes a value capable of correcting an amount of error caused by the delay of the change in the bed temperature of the DPF 22.

Figure 11:
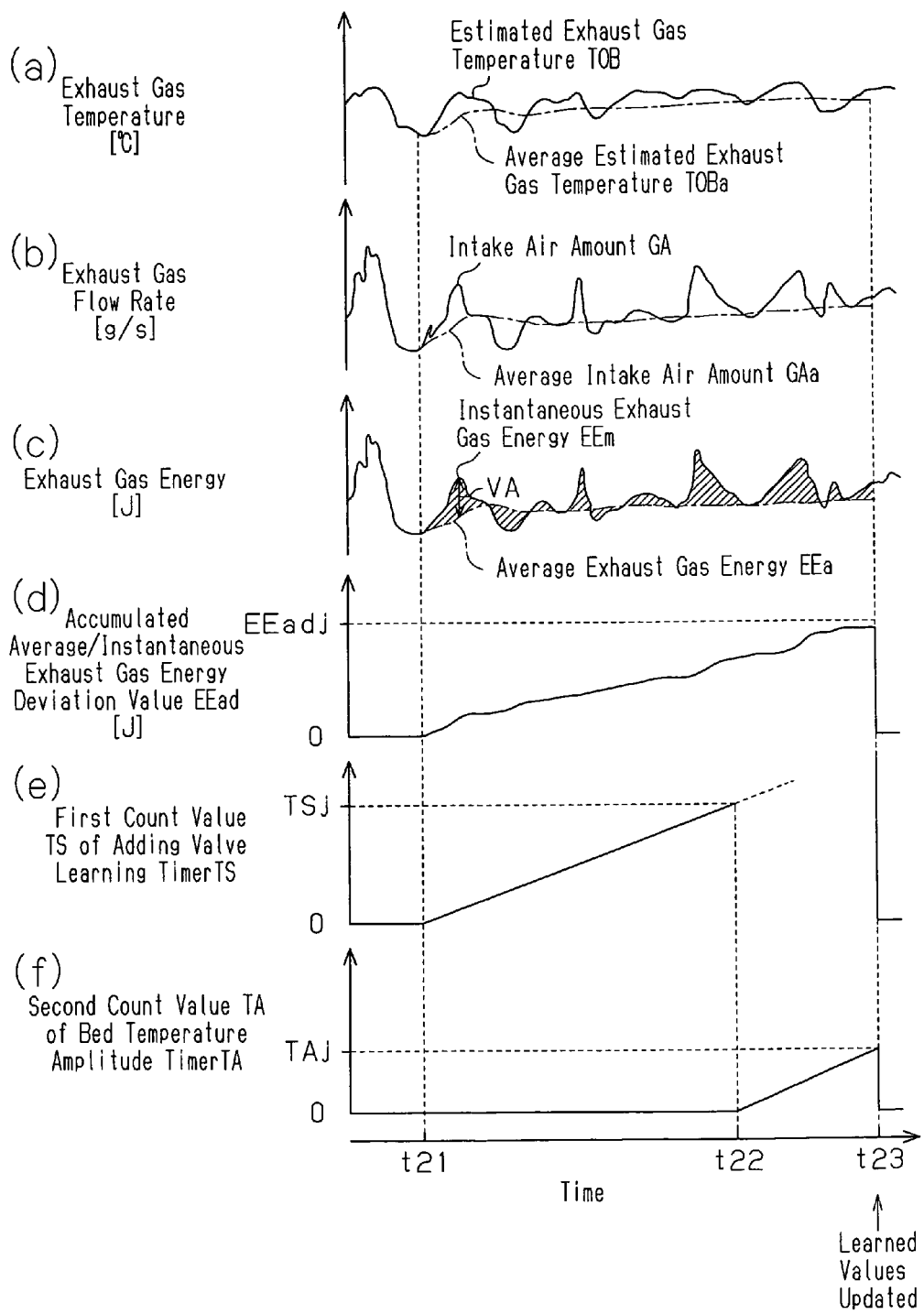
FIGS. 11(a), 11(b), 11(c), 11(d), 11(e), and 11(f) are timing charts each representing the learning procedure.

Accordingly, as illustrated in FIG. 11(*f*), when the second count value TA reaches the second timer determination value TAj at the time point t23 and the maximum bed temperature amplitude ATCmax is smaller than the amplitude determination value ATCj, the steady state learned value Ka or the transient state learned value Kb is updated.

After the steady state learned value Ka or the transient state learned value Kb is updated in the above-described manner, the first count value TS is reset to "0" in step S540 of FIG. 9. Further, the energy deviation accumulated value EEad is reset to "0" in step S550, the second count value TA is reset to "0" in step S560, and the maximum bed temperature amplitude ATCmax is reset to "0" in step S570. The procedure is then suspended.

When determination is negative in step S410 of FIG. 8, in other words, when the learning conditions La to Lg are not satisfied, the ECU 30 performs steps S540 to S570 illustrated in FIG. 9. In other words, the first count value TS, the energy deviation accumulated value EEad, the second count value TA, and the maximum bed temperature amplitude ATCmax are all reset to "0". The procedure is then suspended.

When negative determination is made in step S490, in other words, when the maximum bed temperature amplitude ATCmax is greater than or equal to the amplitude determination value ATCj, the ECU 30 updates neither the steady state learned value Ka nor the transient state learned value Kb. Afterwards, the second count value TA is reset to "0" in step S560 and the maximum bed temperature amplitude ATCmax is reset to "0" in step S570.

In this case, steps S470 and S480 are repeatedly performed until the maximum bed temperature amplitude ATCmax becomes smaller than the amplitude determination value ATCj. Specifically, the ECU 30 repeatedly calculates the bed temperature amplitude ATC and the maximum bed temperature amplitude ATCmax. When determination of step S490 becomes positive, in other words, when the maximum bed temperature amplitude ATCmax becomes smaller than the amplitude determination value ATCj, the ECU 30 updates the steady state learned value Ka and the transient state learned value Kb as illustrated in steps S500 to 5530.

As has been described, the ECU 30 performs the bed temperature control by which the bed temperature of the exhaust gas purifying catalyst 20 is adjusted to the target bed temperature Ttc through addition of the unburned fuel to the exhaust gas. Further, in order to correct the difference between the bed temperature and the target bed temperature Ttc at the respective time points when the bed temperature control is performed, the ECU 30 learns the steady state learned value Ka and the transient state learned value Kb of the addition amount of the unburned fuel. In step S510, the ECU 30 functions as a determining section that determines whether the flow of the exhaust gas to the exhaust gas purifying catalyst 20 is in a steady state. The ECU 30 functions also as a storage section. The storage section stores the correction K as the steady state learned value Ka when the determining section determines that the flow of the exhaust gas is in a steady state but as the transient state learned value Kb when the determining section does not determine that the flow of the exhaust gas is in a steady state. Further, in the bed temperature control, the ECU 30 functions as a reflecting section that reflects in the fuel addition amount the transient state learned value Kb out of the steady state learned value Ka and the transient state learned value Kb.

When performing the NOx reduction control, the ECU 30 functions as a control executing section that executes control based only on the steady state learned value Ka out of the steady state learned value Ka and the transient state learned value Kb. The period in which the energy deviation accumulated value EEad is calculated under the learning condition Lb is a determination period in which the determining section performs determination.

The illustrated embodiment has the following advantages.

(1) When the flow of the exhaust gas is in a steady state, the ECU 30 learns the steady state learned value Ka for correcting an error of the addition amount through the fuel adding valve 23. In contrast, when the exhaust gas flow is in a transient state, the ECU 30 learns the transient state learned value Kb for correcting an amount of error due to the heat capacity of the exhaust gas purifying catalyst 20.

The ECU 30 reflects the steady state learned value Ka and the transient state learned value Kb in the first target addition amount Qr1 of the PM removal control. The ECU 30 reflects the steady state learned value Ka and the transient state learned value Kb also in the second target addition amount Qr2 of the sulfur poisoning elimination control. Accordingly, an error of the addition amount of the fuel adding valve 23 is compensated, and an error caused by the heat capacity of the exhaust gas purifying catalyst 20 is also corrected. As a result, in the illustrated embodiment, excessive correction of the fuel addition amount is suppressed. In other words, unnecessary increase of the fuel consumption amount is suppressed and excessive rise of the bed temperature of the exhaust gas purifying catalyst 20 is prevented. That is, the ECU 30 appropriately controls the bed temperature of the NSR catalyst 21 and the bed temperature of the DPF 22 in such a manner that the bed temperatures change in the respective desirable manners.

The ECU 30 reflects only the steady state learned value Ka in the third target addition amount Qr3 of the NOx reduction control. In the NOx reduction control, it is unnecessary to consider the heat capacity of the exhaust gas purifying catalyst 20 as long as the oxygen concentration of the exhaust gas is accurately regulated by adjusting the fuel addition amount. In other words, in the NOx reduction control, it is unnecessary to consider the delay of change in the bed temperature of the NSR catalyst 21 at the time when the fuel is added to the exhaust gas. The steady state learned value Ka is learned in a state without the influence by the heat capacity of the exhaust gas purifying catalyst 20. Accordingly, the ECU 30 is allowed to appropriately perform the NOx reduction control by using only the steady state learned value Ka without using the transient state learned value Kb. In other words, the ECU 30 does not take into consideration the superfluous transient state learned value Kb, and the adjustment accuracy of the oxygen concentration of the exhaust gas is improved. Specifically, the transient state learned value Kb may decrease the accuracy of adjustment of the oxygen concentration of the exhaust gas by the NOx reduction control. Accordingly, the ECU 30 is allowed to appropriately compensate an error of the addition amount through the fuel adding valve 23 and accurately adjust the fuel addition amount.

That is, the ECU 30 is capable of learning and using an amount of error caused by the change over time of the fuel addition mechanism and an amount of error due to the heat capacity of the exhaust gas purifying catalyst 20 independently from each other.

When the flow of the exhaust gas to the exhaust gas purifying catalyst 20 is in a transient state, the difference between the bed temperature of the exhaust gas purifying catalyst 20 and the target bed temperature Ttc includes an amount of error caused by the heat capacity of the DPF 22. Accordingly, the ECU 30 learns the transient state learned value Kb as a value capable of correcting an amount of error caused by the heat capacity of the DPF 22.

Contrastingly, when the exhaust gas flow is in a steady state, the difference between the bed temperature of the DPF 22 and the target bed temperature Ttc includes an extremely small amount of error due to the heat capacity of the DPF 22. In this case, the bed temperature of the exhaust gas purifying catalyst 20 is a value corresponding to the amount of the unburned fuel added to the exhaust gas. In other words, the difference between the bed temperature of the exhaust gas purifying catalyst 20 and the target bed temperature Ttc is a value corresponding to an error of the fuel addition amount. That is, this difference is a value corresponding to an error of the addition amount of the unburned fuel adding mechanism. As a result, the ECU 30 learns the steady state learned value Ka as a value capable of correcting an error of the addition amount of the fuel adding mechanism.

(2) To determine whether the flow of the exhaust gas to the exhaust gas purifying catalyst 20 is in a steady state or a transient state, the ECU 30 calculates the energy deviation accumulated value EEad, which is the accumulated value of the difference between the average exhaust gas energy EEa and the instantaneous exhaust gas energy EEm. When the energy deviation accumulated value EEad is smaller than the steady state determination value EEadj, the ECU 30 determines that the flow of the exhaust gas is in a steady state. When the energy deviation accumulated value EEad is greater than or equal to the normal state determination value EEadj, the ECU 30 determines that the flow of the exhaust gas is in a transient state. This allows the ECU 30 to determine the state of the exhaust gas easily and with high accuracy. The flow rate of the exhaust gas corresponds to the amount of the intake air flowing in the intake passage 16. In other words, the ECU 30 is allowed to use the intake air amount GA as the flow rate of the exhaust gas.

(3) The average exhaust gas energy EEa is calculated as the product of the average of the estimated exhaust gas temperature TOB, which is periodically obtained since the learning conditions La to Lg are satisfied, and the average of the intake air amount GA. The instantaneous exhaust gas energy EEm is obtained as the product of the estimated exhaust gas temperature TOB, which is periodically obtained since the learning conditions La to Lg are met, and the intake air amount GA. This minimizes the load of calculation of the ECU 30 for determining the energy deviation accumulated value EEad.

(4) When the learning conditions La to Lg are not satisfied, in other words, when any one of the learning conditions La to Lg is not met, learning of the steady state learned value Ka and the transient state learned value Kb is not carried out. This allows the ECU 30 to appropriately obtain the steady state learned value Ka and the transient state learned value Kb.

The illustrated embodiment may be modified as follows.

The ECU 30 does not necessarily have to use the estimated bed temperature Tbc, but may actually detect the temperature of the DPF 22. Also, the ECU 30 does not necessarily have to use the intake air amount GA, but may actually detect the flow rate of the exhaust gas.

The ECU 30 does not necessarily have to perform the sulfur poisoning elimination control of the NSR catalyst 21.

The control based only on the steady state learned value Ka out of the steady state learned value Ka and the transient state learned value Kb is not restricted to the NOx reduction control of the NSR catalyst 21. The ECU 30 may carry out determination control by which the ECU 30 determines whether there is a clog in the fuel adding valve 23 based only on the steady state learned value Ka.

When the degree of clogging of the nozzle of the fuel adding valve 23 increases, the fuel addition amount through the fuel adding valve 23 decreases. To compensate the fuel addition amount through the fuel adding valve 23, the steady state learned value Ka is increased. Accordingly, by monitoring the steady state learned value Ka, the ECU 30 is allowed to determine the clogging degree of the nozzle of the fuel adding valve 23. For example, when the steady state learned value Ka is greater than a clogging determination value, the ECU 30 determines that the fuel adding valve 23 is in an abnormal state.

If a value reflecting an error of the addition amount through the fuel adding valve 23 is used in clogging determination control of the fuel adding valve 23, the determination accuracy is improved. However, if a value reflecting the influence by the heat capacity of the exhaust gas purifying catalyst 20 is used in the clogging determination control of the exhaust gas purifying catalyst 20, the determination accuracy may be lowered. In the illustrated embodiment, the ECU 30 performs the clogging determination control of the fuel adding valve 23 using the steady state learned value Ka. This cancels the influence by the heat capacity of the exhaust gas purifying catalyst 20, thus improving the clogging determination control of the fuel adding valve 23.

In the PM removal control or the sulfur poisoning elimination control, the steady state learning value Ka and the transient state learned value Kb do not both have to be reflected in the opening time of the fuel adding valve 23. For example, the steady state learned value Ka may be reflected in the opening time of the fuel adding valve 23 and the transient state learned value Kb may be reflected in the closing time of the fuel adding valve 23. Also, the transient state learned value Kb may be reflected in the suspension period of the fuel addition to the exhaust gas in the sulfur poisoning elimination control.

In the PM removal control, stepwise heating control of the DPF 22 may be performed. Specifically, the ECU 30 raises the target bed temperature Ttc of the DPF 22 in the PM removal control in correspondence with decrease of the PM accumulation amount and in a stepwise manner, for example, 600° C.→630° C.→650° C. In this case, the ECU 30 may add a learning condition Lh "changing of the target bed temperature Ttc in the stepwide heating control is not currently carried out" to the logical AND condition.

In the PM removal control, it is desirable to set the target bed temperature Ttc to a relatively low level when the PM accumulation amount of the DPF 22 is great and to a relatively high level when the PM accumulation amount of the DPF 22 is small. Specifically, if some of the accumulated PM burns when the PM accumulation amount of the DPF 22 is great, the rest of the accumulated PM may be burned easily. However, if some of the PM burns when the PM accumulation amount of the DPF 22 is small, the rest of the accumulated PM does not easily burn. In the stepwise bed temperature control of the DPF 22, the target bed temperature Ttc is changed in a stepwise manner in correspondence with the PM accumulation amount of the DPF 22. When the target bed temperature Ttc is changed through the stepwise heating control, the temperature of the exhaust gas may rapidly change. This makes it difficult to learn the steady state learned value Ka and the transient state learned value Kb appropriately. This problem is avoided by setting the learning condition Lh.

The transient state learned value Kb may include an amount of error of the addition amount through the fuel adding valve 23 and an amount of error caused by the influence of the heat capacity of the exhaust gas purifying catalyst 20. The ECU 30 may reflect only the transient state learned value Kb out of the steady state learned value Ka and the transient state learned value Kb in the target addition amount in the PM removal control or the sulfur poisoning elimination control.

The steady state learned value Ka or the transient state learned value Kb does not have to be the learning coefficient by which each of the first target addition amounts Qr1 to the third target addition amount Gr3 is multiplied. The steady state learned value Ka and the transient state learned value Kb may each be a learning amount that is added to the first target addition amount Qr1 to the third target addition amount Qr3. It is desirable to set the steady state learned value Ka and the transient state learned value Kb, which are to be added, each for the respective operating ranges of the engine 10 and update the steady state learned value Ka and the transient state learned value Kb separately.

The method in which the ECU 30 determines whether the flow of the exhaust gas to the exhaust gas purifying catalyst 20 is in a steady state may be changed as needed. For example, the ECU 30 may detect the difference between the maximum value and the minimum value of the instantaneous exhaust gas energy EEm and determine that the flow of the exhaust gas is in a steady state when the difference is smaller than a determination value. Alternatively, the ECU 30 may detect the difference between the maximum value and the minimum value of the intake air amount GA and the difference between the maximum value and the minimum value of the estimated exhaust gas temperature TOB. When the difference of the intake air amount GA is smaller than a determination value and the difference of the estimated exhaust gas temperature TOB is smaller than a determination value, the ECU 30 may determine that the flow of the exhaust gas to the exhaust gas purifying catalyst 20 is in a steady state.

The learning condition is not restricted to the logical AND condition including all of the learning conditions La to Lg. The learning condition may be a logical AND condition including only the learning conditions La to Ld or the learning conditions La to Lf. In other words, the learning condition may be any suitable logical AND condition, as long as the logical AND condition includes some of the learning conditions La to Lg.

The present invention may be employed in learning of the steady state learned value Ka and the transient state learned value Kb of the fuel addition amount by which the difference between the bed temperature and the target bed temperature of the NSR catalyst 21 is corrected periodically when the heating procedure is performed in the sulfur poisoning elimination control.

The bed temperature control does not necessarily have to mainly employ the addition of the unburned fuel from the fuel adding valve 23, which is arranged in the exhaust passage 18. The bed temperature control may mainly use the post injection. Specifically, in the present invention, the exhaust emission purification controller of the internal combustion engine may operate in any suitable manner as long as the controller controls the bed temperature of the exhaust gas purifying catalyst 20 through addition of the unburned fuel to the exhaust gas.

The present invention is not restricted to use in the diesel engine but may be used in a gasoline engine.

The invention claimed is:

1. An exhaust emission purification controller of an internal combustion engine, the engine including aft exhaust passage and an exhaust gas purifying catalyst arranged in the exhaust passage, the controller performing a bed temperature control in which a bed temperature of the exhaust gas purifying catalyst is adjusted to a target bed temperature through addition of unburned fuel to exhaust gas, wherein, when carrying out the bed temperature control, the controller learns a learned value of an addition amount of the unburned fuel so as to correct a difference between the bed temperature, which is detected periodically, and the target bed temperature, the controller comprising:
a determining section that is configured to determine whether a flow of exhaust gas to the exhaust gas purifying catalyst is in a steady state;
a storage section that is configured to store the learned value as a steady state learned value when the determining section determines that the flow of the exhaust gas is in the steady state, and stores the learned value as a transient state learned value when the determining section does not determine that the flow of the exhaust gas is in the steady state;
a reflecting section that is configured to reflect at least the transient state learned value out of the steady state learned value and the transient state learned value in the addition amount of fuel when the bed temperature control is carried out; and
a control executing section that is configured to execute a control based only on the steady state learned value out of the steady state learned value and the transient state learned value.

2. The exhaust emission purification controller according to claim 1, wherein the control based only on the steady state learned value performed by the control executing section is a concentration adjustment control, in which an oxygen concentration of the exhaust gas is adjusted by adding the unburned fuel to the exhaust gas.

3. The exhaust emission purification controller according to claim 1, wherein an exhaust gas energy is obtained from an exhaust gas temperature, which is the temperature of the exhaust gas flowing to the exhaust gas purifying catalyst, and an exhaust gas flow rate, an average of the exhaust gas energy being referred to as an average exhaust gas energy, an instantaneous value of the exhaust gas energy being referred to as an instantaneous exhaust gas energy, and wherein the determining section determines that the flow of the exhaust gas is in the steady state when an accumulated value of the deviation between the average exhaust gas energy and the instantaneous exhaust gas energy is smaller than a determination value.

4. The exhaust emission purification controller according to claim 3, wherein a condition for learning the learned value is referred to as a learning condition, wherein the exhaust gas temperature and the exhaust gas flow rate are obtained periodically once the learning condition is satisfied, wherein an average of the exhaust gas temperature and an average of the exhaust gas flow rate are obtained periodically once the learning condition is satisfied, and wherein the average exhaust gas energy is calculated as a product of the average of the exhaust gas temperature and the average of the exhaust gas flow rate, and the instantaneous exhaust gas energy is obtained as a product of the exhaust gas temperature and the exhaust gas flow rate.

5. The exhaust emission purification controller according to claim 4, wherein the internal combustion engine is a diesel engine, the exhaust gas purifying catalyst including a diesel particulate filter collecting particulate matter from the exhaust gas, the bed temperature control including a PM removal control, which is a control by which the particulate matter accumulated on the diesel particulate filter is burned and removed, the PM removal control including an intermittent fuel addition in which fuel is added intermittently, the learning condition including a logical AND condition of:

La: the intermittent fuel addition is not currently carried out;

Lb: the accumulated time in which the target bed temperature is lower than or equal to a low temperature determination value does not exceed a predetermined time in a determination period in which the determining section performs determination;

Lc: the accumulated time in which the exhaust gas flow rate is smaller than or equal to a low amount determination value does not exceed a predetermined time in the determination period; and Ld: updating of the learned value is not currently performed.

6. An exhaust emission purification system comprising:

the exhaust emission purification controller according to claim 5; and a first fuel adding portion and a second fuel adding portion each for adding unburned fuel to the exhaust gas, the first fuel adding portion including a fuel adding valve arranged in the exhaust passage, the second fuel adding portion being formed by a mechanism other than the first fuel adding portion, wherein the logical AND condition of the learning condition further includes:

Le: the second fuel adding portion is not currently adding unburned fuel; and

Lf: addition of unburned fuel from the first fuel adding portion is not currently prohibited.

7. The exhaust emission purification controller according to claim 5, wherein an exhaust gas temperature sensor is arranged in the exhaust passage, the learned value being learned based on the exhaust gas temperature detected by the exhaust gas temperature sensor, and wherein the logical AND condition of the learning condition further includes:

Lg: the exhaust gas temperature sensor is not currently in an abnormal state.

* * * * *